United States Patent

[11] 3,524,466

| [72] | Inventor | Davis A. Van Scoy |
| | | Houston, Texas |
| [21] | Appl. No. | 693,209 |
| [22] | Filed | Dec. 26, 1967 |
| [45] | Patented | Aug. 18, 1970 |
| [73] | Assignee | Helmerich & Payne, Inc. |
| | | Houston, Texas |
| | | a Corp. of Delaware |

[54] FLOW TEE FOR PIPELINE PIGS
11 Claims, 3 Drawing Figs.

[52] U.S. Cl. .................................................. 137/268,
15/105.06
[51] Int. Cl. .................................................. B08b 9/04
[50] Field of Search .......................................... 137/268;
251/14; 15/105.06c; 137/80

[56] References Cited
UNITED STATES PATENTS

| 2,976,928 | 3/1961 | Gilbert | 15/104.06(A)UX |
| 3,158,888 | 12/1964 | Erickson | 15/104.06(A)UX |
| 3,175,240 | 3/1965 | Hillard | 137/268X |
| 3,322,140 | 5/1967 | Scott | 137/268 |
| 3,370,827 | 2/1968 | Stehlin | 251/14 |
| 3,425,083 | 2/1969 | Wennerberg et al. | 137/268X |

Primary Examiner— M. Cary Nelson
Assistant Examiner— Robert J. Miller
Attorneys—Ned L. Conley, Murray Robinson, James A. Bargfrede, Robert W. B. Dickerson and Bill B. Berryhill ABSTRACT: A tee for installation in a main pipeline to connect a side pipeline for alternate delivery of fluid therethrough, wherein both the main pipeline and the side pipeline have valves for operation to determine direction of flow, the tee containing a tubular element connecting the inlet and outlet portions of the main pipeline and slotted for passage of fluid from the main pipeline to the side pipeline without undue flow restriction, and further containing holes spaced downstream from the slots to allow exhausting of liquid trapped between a pig and a closed valve in the main pipeline, said holes having a maximum size determined by the maximum bypass flow allowable to maintain adequate pressure drop to cause the pipeline pig to continue moving through the line when the main pipeline valve is closed; and alternatively, check valve means are provided to prevent bypass flow through the holes.

Patented Aug. 18, 1970

3,524,466

Davis A. Van Scoy
INVENTOR

BY

ATTORNEY

FLOW TEE FOR PIPELINE PIGS

BACKGROUND OF THE INVENTION

1. Field of the Invention

The invention is in structure utilized in pipelines principally used for the transmission of liquids over long distances, such as petroleum and petroleum product pipelines. In such pipelines various devices, generically known as pigs, are passed through for cleaning, for separating different sequential fluids in the lines, and for purging liquids and gases from the lines. Such pigs often take the form of a flexible sphere made of natural or synthetic rubber or similar materials. Such spheres usually have a slight interference in the line so as to form a seal and the spheres are moved through the line by fluid pressure. In order to keep the sphere moving through the line it is necessary to have a pressure differential across the sphere on an average of about two pounds per square inch.

2. Description of the Prior Art

Where a side outlet line intersects a main flow line, the seal around a sphere may be broken so that no pressure differential exists across the sphere and the sphere will not move past the intersection. In order to maintain the seal at such locations, it has been the practice to insert a tee in the line with a tubular sleeve in it aligned with and having substantially the size of the main flow line, and having circumferentially extending slots through which liquid may flow into the side outlet when a valve in that outlet is open and the valve in the main pipeline is closed. The slots are made narrow enough that the sphere can pass them without losing its seal. It will be appreciated, however, that if a valve downstream of the tee in the main line is closed, while a valve in the side line is opened to allow liquid to flow through it, liquid will be trapped between the sphere and the closed valve as soon as the sphere covers the slots in the tee, so that the sphere will be stopped with the slots closed, and no liquid can move into the side line.

To avoid this, it has been the practice to put additional holes in the tubular sleeve in the tee downstream of the slots, so that the sphere can continue to move far enough to clear the slots. However, when this is done, difficulty is sometimes encountered when the pipeline is operated for straight through flow, particularly at relatively low flow rates, since the sphere may stop in the tubular pipe between the slots and the holes and liquid may flow out of the pipe through the slots and back in through the holes, thereby bypassing the sphere so that there is insufficient pressure differential to cause the sphere to continue moving through the pipeline.

SUMMARY OF THE INVENTION

According to the present invention, means are provided whereby trapped liquid is allowed to flow out of the sleeve in the tee into the side outlet when the valve in the main pipeline is closed, but at the same time, the tee is designed so that the liquid bypass is restricted enough to insure maintenance of adequate pressure differential so that the sphere continues to move through the pipeline in a straight through flow operation.

In one embodiment of the invention, these effects are accomplished by providing holes with a flow area within a range adequate to accomplish the desired results. In another embodiment of the invention, check valve means are utilized with the holes so as to allow flow from within the tubular sleeve into the tee but to prevent flow from the tee into the tubular sleeve. This structure insures adequate movement of trapped fluid from within the tubular sleeve but prevents bypassing of liquid around the sphere during a straight through flow operation.

DESCRIPTION OF THE PREFERRED EMBODIMENTS

Figure 1:
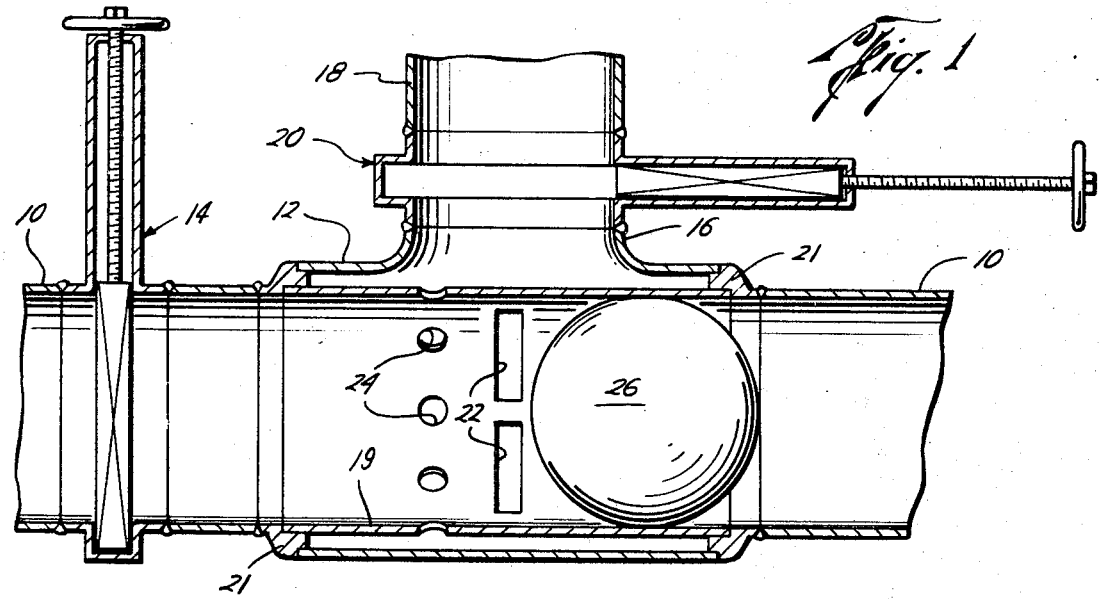
FIG. 1 is a partly schematic sectional view of one embodiment of the invention.

In FIG. 1 of the drawing, the main pipeline 10 is shown as having a tee 12 therein and a valve 14 downstream of the tee. A simulated gate valve is shown, but other full-opering type valves may be used. The side outlet 16 of the tee has connected thereto a side pipeline 18 which contains a valve 20.

In the embodiment shown, the tee 12 contains a sleeve 19 extending longitudinally of the straight-through portion thereof, having an inner diameter substantially equal to that of the main pipeline 10, and fastened to annular rings 21 at each end, as by welding. The annular rings provide connectors for welding to the main pipeline and to the tee. The tee is larger than the sleeve, so as to provide an annular space around the sleeve. The sleeve is provided with a plurality of circumferentially extending slots 22 which are shown as being substantially at the center line of the outlet 16 of the tee, and a plurality of apertures or holes 24 downstream of the slots 22. The slots must have a combined area sufficient to allow flow of liquid through the side outlet without a pressure drop of more than about 4 psi at the maximum flow rate, and the width of the slots, measured longitudinally of the sleeve, must not be substantially greater than the width of the portion of the pig which engages the wall of the sleeve, so as to avoid excessive fluid bypass. The distance between the slots and the holes must be sufficient to allow the sphere 26 to clear the slots before it covers the holes. If another type of pig, such as a cylindrical plug, is used, then the holes must be even farther away to be sure that the holes are not completely covered up by the pig before the slots are fully opened.

The operation of this embodiment of the invention will now be described in terms of the use of the apparatus for the delivery of sequential different liquids. In this operation if the first product in the line is to be delivered through the main line 10, the valve 14 will be open and the valve 20 will be closed. Thus the liquid will be delivered straight through the tee. A sphere or other pigging device is caused to move therethrough by a pressure differential across it. Usually at least about two pounds per square inch pressure differential is required to move a sphere through the line. It will be appreciated that during its movement through the sleeve 19 the liquid will bypass the sphere when it is between the slots 22 and the holes 24. If the area of these slots 22 and holes 24 is great enough, a substantial fluid flow may bypass the sphere and there will be insufficient pressure differential across the sphere to cause it to be moved downstream with the fluid. Therefore, in order to insure that the sphere continues to move through the pipeline, it is necessary that, at the minimum flow rate of the pipeline, there be a pressure drop through the slots and the holes of at least about two pounds per square inch. Thus the maximum total area of the holes 24 is a function of this required pressure drop.

The second product in the line is separated from the first product by a sphere 24. Upon arrival of the sphere near the tee, which arrival is indicated by a signaling device, as is well known in the art, the valve 14 is closed and the valve 20 is opened so that the second product may be delivered through the side pipeline 18. When the valve 14 is closed, the sphere can continue to move along the main pipeline and within the sleeve 19 within the tee only so long as the liquid between the sphere and the closed valve 14 has an outlet. Thus, the sphere will move down until it covers the slots 22. Because of the presence of the openings 24 downstream of the slots 22, the sphere may continue to move further to clear the slots by expelling liquid through the holes 24. Flow of fluid through the holes 24 reduces the pressure surge created in the pipeline upon the covering of the slots.

Such pipeline systems are usually provided with pressure surge sensors in the line which shut down the pumps in the event that the line pressure rises substantially (usually about 20 to 30 pounds per square inch) above the normal operating pressure. Thus, the openings 24 must be large enough to prevent a pressure rise, when the slots 22 are closed, of more than about 20 pounds per square inch.

Figure 2:
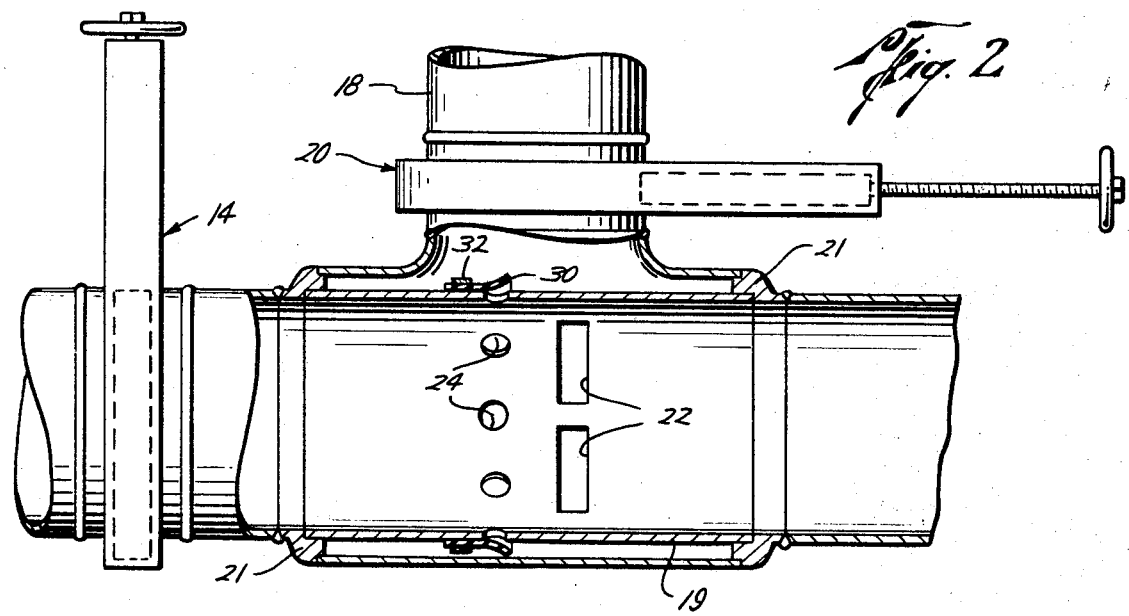
FIG. 2 is a similar view of another embodiment of the invention.

In the embodiment shown in FIG. 2, the sleeve 19 is provided with a flexible resilient annular band 30 covering the holes 24, and retained in place by a retaining clamp 32 which may be an ordinary hose clamp. This band 30, which may be made of natural or synthetic rubber or the like, constitutes a check valve means. Thus, when the valve 14 is open and the sphere or other pig reaches the space between slots 22 and openings 24, fluid flowing out of the sleeve 19 through the slots 22 cannot flow back into the sleeve through the openings 24 so as to bypass the sphere and cause it to stop moving between the slots and the holes 24. However, when the valve 14 is closed and the sphere moves past the slots 22, the band 30 will be forced open by the pressure of the fluid trapped between the sphere and the valve 14 so that the fluid may flow outwardly through the openings 24 into the side conduit 18. The strength of the member 30 is selected so that it will flex outwardly under a pressure of no more than about 20 pounds per square inch and thereby avoid shutting down the pipeline by actuation of pressure surge sensors in the line.

Figure 3:
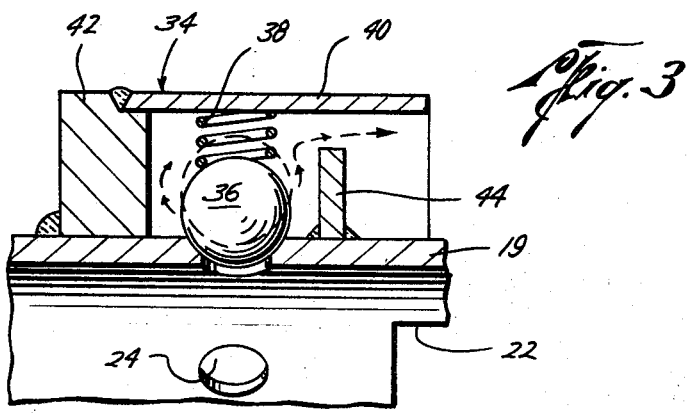
FIG. 3 is an enlarged fragmentary view illustrating still another embodiment of the invention.

In the embodiment shown in FIG. 3, the sleeve 19 is provided with check valve means 34 comprising a plurality of ball checks 36 adapted to seat in the openings 24. The ball checks may be provided with springs 38 to hold the balls in place and may be enclosed within a guide housing comprising a tubular member 40 attached to an annular cover member 42 and a guide member 44, with space being left between the guide member 44 and the member 40 for fluid flow therebetween.

As in the embodiment shown in FIG. 2, when valve 14 is open and the sphere reaches the space between slots 22 and openings 24, fluid flowing out the sleeve 19 through the slots 22 cannot, because of the ball checks, flow back into the sleeve through the openings 24 so as to bypass the sphere and cause it to stop moving between the slots and the openings 24. However, when the valve 14 is closed and the sphere moves past the slots 22, the pressure of the fluid trapped between the sphere and the valve 14 will force open the ball checks 36 so that fluid may flow outwardly through the openings 24 into the side conduit 18. The springs 38 are designed to allow the ball checks to open at pressures of no more than about 20 pounds per square inch so as to avoid actuation of pressure surge sensors.

It is apparent that when the embodiments of FIGS. 2 and 3 are used, there is no limitation on maximum size of the holes 24, since fluid cannot bypass the sphere when fluid flow is straight through the tee. Thus the holes 24 may be as large as desired or practical in view of physical limitations.

As previously stated, however, the holes 24 in the embodiment of FIG. 1 must be small enough to insure at least two pounds per square inch pressure drop when fluid bypasses the pig through slots 22 and holes 24. The determination of this maximum size may be illustrated by an example. Assume a 16-inch inch pipeline carrying within it an inflated sphere having a diameter such that the periphery of the sphere is flattened for a distance 3½ inches longitudinally of the pipe. The pipeline is carrying a liquid having a viscosity under 1000 centipoises at flow rates of from 1000 to 8000 barrels per hour (BPH). The tee is to be provided with four slots 22 and eight holes 24, all of which are sharp edged. The flow is assumed to divide equally through the slots and holes. The maximum area of the holes may then be determined from the equation $$A = \frac{Q}{C_c C_v 2gh}$$

where Q is the minimum flow rate, $C_c$ is the coefficient of contraction of the holes, $C_v$ is the coefficient of velocity, $g$ is gravity, and h is the minimum permissible pressure drop. For a flow rate of 1000 BPH and a pressure drop of 2 psi, the minimum required to insure that the sphere continues to move, the maximum area of each of the eight holes if calculated to be 2.52 square inches, or slightly over 1¾ inch diameter.

To prevent undue restriction on flow of fluid through the side outlet 16, it has been found that the slots 22 must be large enough to produce a pressure drop of no more than about 4 psi at the maximum flow rate. Under the conditions set forth in the preceding paragraph, the area of each slot is calculated to be a minimum of 24.8 square inches. If the maximum slot length (longitudinally of the pipe) of 3½ inches is used, the circumferential length should be at least 7.1 inches, or 54 degrees of arc. As a practical matter, 75 degrees of arc would preferably be used, since the 15 degrees arc of pipe between the slots would provide adequate structural strength.

Although several embodiments of the invention have been shown and described herein, the invention is not limited to the specific embodiments, but only as set forth by the appended claims.

I claim:
1. In a tee for installation in a main pipeline to connect a side pipeline for alternate delivery of fluid therethrough, and which includes a tubular element connecting the inlet and outlet portions of the main pipeline, said tubular element having an opening in its wall for passage of fluid from the main pipeline to the side pipeline, the improvement which comprises:
at least one port in the wall of the tubular element spaced downstream of said opening and having its downstream edge spaced away from said opening a distance at least equal to the width of said opening measured longitudinally of said tubular element, the total port area being no greater than that required to cause a pressure drop of at least 2 psi when the minimum flow of fluid of said main pipeline is passing therethrough.

2. A tee as defined by claim 1 wherein the total opening area is large enough to insure a pressure drop of no more than 4 psi when the maximum flow of fluid of said side pipeline is passing therethrough.

3. A tee as defined by claim 2 and including:
a pig in said tee having an area thereon sealingly engageable with the inside of said tubular element, the length of said area, measured longitudinally of said tubular element, being at least as great as the said width of said opening, and no greater than said distance.

4. In a tee for installation in a main pipeline to connect a side pipeline for alternate delivery therethrough, and which includes a tubular element connecting the inlet and outlet portions of the main pipeline, said tubular element having an opening in its wall for passage of fluid from the main pipeline to the side pipeline, the improvement which comprises:
at least one port in the wall of the tubular element spaced downstream of said opening and having its downstream edge spaced away from said opening a distance at least equal to the width of said opening measured longitudinally of said tubular element;
and means associated with said port providing a resistance of at least 2 psi to flow of fluid through said port into said tubular element at the minimum flow rate of said main pipeline.

5. Apparatus as defined by claim 4 wherein said means comprises a limited area of said port.

6. In a tee for installation in a main pipeline to connect a side pipeline for alternate delivery therethrough, and which includes a tubular element connecting the inlet and outlet portions of the main pipeline, said tubular element having an opening in its wall for passage of fluid from the main pipeline to the side pipeline, the improvement which comprises:
at least one port in the wall of the tubular element spaced downstream of said opening and having its downstream edge spaced away from said opening a distance at least equal to the width of said opening measured longitudinally of said tubular element;
and a check valve over said port positioned to allow flow outwardly from said tubular element but to restrict flow inwardly into said tubular element.

7. Apparatus as defined by claim 6 wherein said check valve comprises a resilient band covering said port.

8. Apparatus as defined by claim 6 wherein said check valve is operable to be opened by a pressure differential of no more than about 30 psi.

9. Apparatus as defined by claim 4 and including:
a pig in said tee having an area thereon sealingly engageable with the inside of said tubular element, the length of said area, measured longitudinally of said tubular element, being at least as great as the said width of said opening, and no greater than said distance.

10. Apparatus as defined by claim 9 wherein the pig is a resilient sphere.

11. In a tee for installation in a main pipeline to connect a side pipeline for alternate delivery of fluid therethrough, and which includes a tubular element connecting the inlet and outlet portions of the main pipeline, said tubular element having an opening in its wall for passage of fluid from the main pipeline to the side pipeline, the improvement which comprises:
at least one port in the wall of the tubular element spaced downstream of said opening and having its downstream edge spaced away from said opening a distance at least equal to the width of said opening measured longitudinally of said tubular element, the total port area being no greater than that required to cause a pressure drop of at least 2 psi when the minimum flow of fluid of said main pipeline is passing therethrough but great enough to prevent a pressure rise of no more than 20 psi at the maximum flow rate when said opening is closed;
said opening having a total area large enough to insure a pressure drop of no more than 4 psi when the maximum flow of fluid of said side pipeline is passing therethrough;
a resilient sphere in said tee having an area thereon sealingly engageable with the inside of said tubular element, the relative diameters of said sphere and said tubular element being such that the length of said area, measured longitudinally of said tubular element, is at least as great as the said width of said opening, and no greater than said distance.